United States Patent [19]

Montelin et al.

[11] Patent Number: 5,440,387
[45] Date of Patent: Aug. 8, 1995

[54] OPTICAL ELEMENT OF A PARALLAX FREE SIGHT

[75] Inventors: Per Montelin, Lund; Lars Stenberg, SkellefteA, both of Sweden

[73] Assignee: Aimpoint AB, Sweden

[21] Appl. No.: 234,868

[22] Filed: Apr. 28, 1994

[30] Foreign Application Priority Data

Apr. 29, 1993 [SE] Sweden ............... 9301472

[51] Int. Cl.$^6$ ............................. G02B 27/34
[52] U.S. Cl. ........................ 356/251; 33/241
[58] Field of Search ............. 356/251, 247, 248, 252; 33/241

[56] References Cited

U.S. PATENT DOCUMENTS

| | | | |
|---|---|---|---|
| 3,942,901 | 3/1976 | Ekstrand | 356/251 |
| 3,963,356 | 6/1976 | Wiklund | 356/251 |
| 4,346,995 | 8/1982 | Morris | 356/251 |
| 4,402,605 | 9/1983 | Ekstrand | 356/252 |
| 4,804,858 | 2/1989 | Jörlöv et al. | 307/66 |
| 4,806,007 | 2/1989 | Bindon | 350/569 |
| 4,940,324 | 7/1990 | Nichols | 356/251 |
| 4,945,646 | 8/1990 | Ekstrand | 33/245 |
| 5,003,697 | 4/1991 | Hampton | 33/244 |
| 5,189,555 | 2/1993 | Jörlöv | 356/251 |

*Primary Examiner*—Samuel A. Turner
*Attorney, Agent, or Firm*—James Ray & Associates

[57] ABSTRACT

A parallax free sight has an optical element, preferably arranged at one end of an elongated light channel. A concave side thereof is parabolically shaped and provided with a partially reflecting layer, in the focal point of which is arranged a light emitting means. The element is moulded in one piece of a plastic material, preferably polycarbonate, and an opposite, convex side is elliptically or hyperbolically shaped, such that any light beam hitting it from the outside continues straight through it with minimal deviation.

20 Claims, 2 Drawing Sheets

OPTICAL ELEMENT OF A PARALLAX FREE SIGHT

TECHNICAL FIELD

This invention relates to a concave-convex optical element for a parallax free sight, the element preferably being moulded in one piece from a plastic material, wherein the concave side of the element, facing the user of the sight, is provided with a partially reflecting layer, in the focal point of which is disposed a light emitting means.

BACKGROUND OF THE INVENTION

Sights of the above general type are often called red-dot sights and are well known in the art. Representative examples of such sights are shown in U.S. Pat. Nos. 4,346,995 and 5,189,555.

For the intended result, namely that the user of the sight mounted on the barrel of a gun can see the target with its surroundings together with an aiming point; i.e., a red dot, in the sight, so that the target can be hit when the red dot is placed thereon, the basic requisite is that the concave side of the optical element be parabolically shaped. Another important feature is that an opposite convex side causes as little deviations of the incoming light beams as possible over its entire surface, so that distortions of the image of the target and its surroundings in the sight are obviated.

Hitherto it has been customary to compose the optical element of two (or even more) sub-elements (with the partially reflective layer between them) in order to obtain a satisfactory, although not perfect result. These different sub-elements have been selected to provide different light refractive indices in order to correct for colour aberration and obtain a satisfactory sharp image. Nevertheless, the result has not been really impressive, especially towards the periphery of the elements. Normally, the optical elements have been made of glass.

With the development of material technology it has rather recently been suggested to manufacture the optical element in one piece from a plastic material. The suggested manufacturing method for such a plastic element is moulding.

The object of the present invention is to improve the optical characteristics of the sight.

THE INVENTION

This and other objects are attained by this invention in that the concave side of the optical element is formed in a way known per se to be parabolically shaped, and in that the opposite convex side of the optical element is elliptically or hyperbolically shaped, such that any external light beam hitting it along the optical axis of the element continues straight through the element with minimal deviation.

The plastic material preferably is polycarbonate, but other materials with satisfactory optical characteristics are conceivable, such as PMMA, an acrylic plastic.

The optical element referred to above is the sole essential element in the sight, which, however, may also have a transparent window arranged at the other end of a light channel for its closure. The transparent window faces the eye of the gunner. In certain embodiments, however, there is no light channel and accordingly no transparent window.

In previous designs with light channels this transparent window has been used to correct optical deficiencies in the optical element and accordingly has been provided with curved surfaces, increasing the price for the sight.

Due to the high optical quality of the optical element manufactured according to the invention, the transparent window need only have plane parallel surfaces.

BRIEF DESCRIPTION OF THE DRAWINGS

The invention will be described in further detail below, reference being made to the accompanying drawings, in which.

DETAILED DESCRIPTION OF A PREFERRED EMBODIMENT

Figure 1:
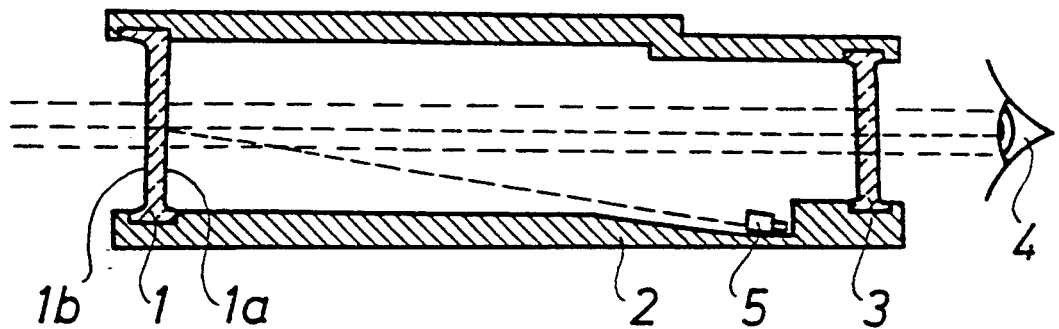
FIG. 1 is a schematic side view through a sight incorporating an optical element manufactured according to the invention.

A sight according to FIG. 1 has a rectangular optical element 1, which is attached to the forward end of a light channel shaped as a tube 2. This tube has a rectangular cross section with greater width than height, so that a wide view for a gunner is obtained. The dimensions of the optical element may for example be 38×26 mm. At the other end of the light channel is attached a transparent window 3, which is directed towards the eye 4 of the gunner using a weapon (not shown) on which the sight is mounted, preferably the barrel of a gun.

A concave side of the optical element 1 directed towards the transparent window 3 is parabolically shaped. The element is mounted in the light channel in such a way that the focal point thereof falls inside of the light channel between the optical element 1 and the transparent window 3, below the center line of the light channel. The center line of the light channel 2 is defined as the sight line. In the focal point; i.e., on the optical axis of the element 1, there is provided a light emitting means, for example a light emitting diode 5. This LED 5, directed at the element 1 where the center line crosses the element, produced an aiming point in the form of a dot, a cross, a ring or the like.

The parabolic inner surface of the element 1 is coated with a partially reflecting layer 1a, which is reflective to a certain narrow frequency, around the frequency 630 nm; i.e., red light only, while light of all other frequencies passes through the element substantially without reflection. This frequency is of course chosen to correspond with the frequency of the light emitted from the light emitting means 5, and not to destroy the dark adaptation of the eye.

The light emitting means 5 may be powered in any suitable way, such as a battery, which need not be further described here.

The other, convex side of the element 1 is coated with an anti-reflecting layer 1b, a so called AR-coating, in order to avoid reflections from this side of the optical element and especially from the LED 5.

With this design the gunner's eye 4 will see a red dot together with an image of the surroundings or target when looking through the sight. Provided that the sight is properly mounted on the gun, the gunner only has to place the red dot on the target to be able to hit it when firing the gun.

In order to obtain a parallax free sight it is imperative that all light beams emitted from the LED 5 are reflected from the optical element 1 towards the eye 4 parallel with the center line of the light channel, which means that this side of optical element 1 ideally has to be parabolically shaped.

Quite as important for obtaining a parallax free sight, in which the image of the target moves together with the red dot provided by the LED 5, is that the external light beams pass through the optical element 1 without any image distorting deviations. As the human eye is a very sensitive instrument, the accuracy has to be extremely high. According to the present requirements, the total system accuracy will be better than 1 milliradian.

If the optical element 1 can be manufactured to this accuracy, the transparent window 3 need only serve as a closure for the light channel and can have simple parallel surfaces instead of certain curved surfaces, which have hitherto been necessary in order to compensate for certain deviations in the element 1, and has normally been composed of two or more sub-elements. The transparent window 3 is also provided with AR-coating.

With present manufacturing techniques it is possible to mould a plastic optical element with high accuracy. The preferred material for the element 1 is polycarbonate, which is widely used for such elements. However, alternative plastic materials, such as PMMA, are conceivable.

The sight has so far been described as being contained in a housing, where a light channel 2 at one end is provided with the optical element 1 and at the other end with the transparent window 3. The optical element 1 manufactured according to the invention may, however, equally well be used without any housing, light channel or transparent window; i.e., standing alone on a weapon. Also, the optical element 1 may have any suitable form, such as circular, and need not be rectangular.

Figure 2:
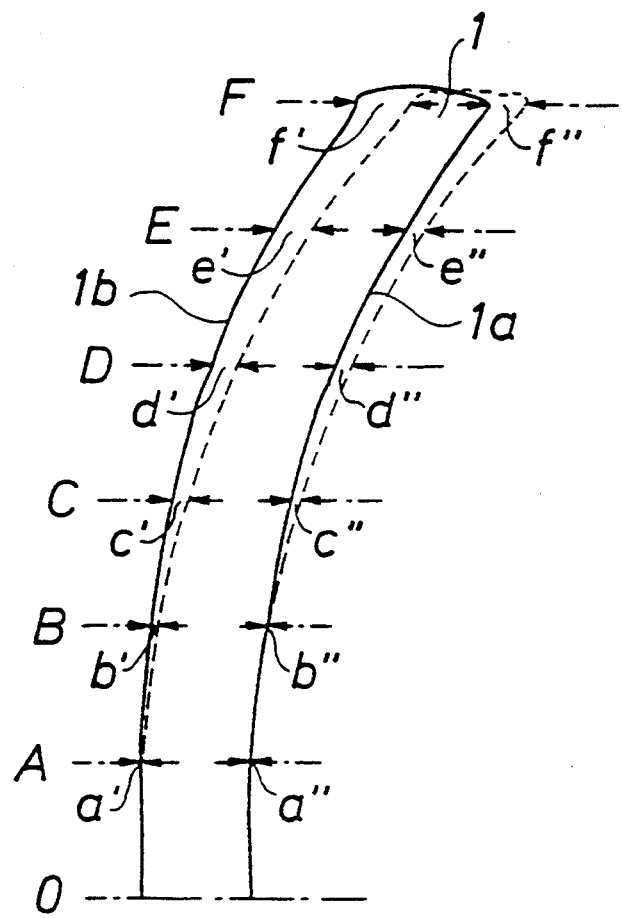
FIG. 2 is an enlarged side view through the element.

FIG. 2 is a section through the optical element 1, where line O represents the optical axis of the element, and lines A–F are parallel levels spaced from the optical axis O with steps of 5 mm each. For example, level D is 20 mm from the optical axis O. The broken curved lines represent spherical surfaces, relative to optical axis O, whereas the full lines indicate the form chosen for the surfaces of optical element 1. The respective distances between the broken lines and the full lines are designated a' and a" for level A, b' and b" for level B and so on, which indicate and define how the surfaces of optical element 1 deviate from a spherical surface.

The refractive index for polycarbonate, being different for different wave-lengths (i.e., colours), has a value of 1.585 at 589 nm. Based thereon and a curvature radius of 192 mm for the concave surface of the optical element 1 it is relatively simple, especially with a computer, to determine the shape of the ideal parabolic surface facing into the light channel. In the next step the form of the other surface of the optical element may be calculated for obtaining the desired result that an incoming light beam passes through the element without deviation or at least with minimal deviation, irrespective of where on the element the beam hits. It appears that while the constant to be used in a formula mentioned below for calculating curved surfaces is $-1.000$ for the ideal parabolic surface, it has been assessed to be $-1.443$ for the opposite side of the optical element 1. With this constant this surface obtains a generally hyperbolic shape.

The calculation formula used for both sides or surfaces is:

$$z = \frac{(x^2 + y^2)}{r(1 + \sqrt{1 - (1/r)^2(c + 1)(x^2 + y^2)})}$$

where
x = an x-coordinate on the surface
y = a y-coordinate on the surface
z = a z-coordinate along the optical axis
r = double focal length, equalling the radius of the curved surface
c = calculated, so called conical constant for the surface.

As mentioned, c is the so called conical constant and is:

| | |
|---|---|
| < | −1 for a hyperbolic surface |
| = | −1 for a parabolic surface |
| > | −1 for an elliptic surface. |

For the parabolic, concave surface, c accordingly equals $-1$, which means that the equation or formula above in this case is reduced to:

$$z = \frac{(x^2 + y^2)}{2r}$$

The focal length f of the parabolic surface is determined with regard to geometrical circumstances and is 96 mm in the present case, which gives a radius r for the parabolic surface of 192 mm, as $r = 2f$. This results in a mathematical relation, which describes the exact geometrical shape of the concave, parabolic surface or side.

Hereafter about 20 parallel light beams are defined; these lights beams are parallel with the optical axis and at increasing distance therefrom. They may be in the same plane, as the optical element is rotationally symmetrical. By means of the refractive index of the material used, the equation or formula above and the refraction law, it is possible to calculate how the light beams will be refracted in passing the optical element. As the thickness of the optical element as well as the curvature radius r and the conical constant c of the convex side or surface of the element are unknown, the equation system cannot be solved. By using the method of least squares and utilizing a powerful computer it is, however, possible to find the solutions by which the light beams are deviated as little as possible at the passage through the optical element.

It appears advantageous to use an optical element, which is as thin as possible, and a plastic material with a refractive index, which is as low as possible.

If the two sides or surfaces have the same radius, it appears that the minimal deviation for the light beams always occurs when the convex side is hyperbolic, irrespective of the refractive index.

However, if the curvature radius r also for the convex side is optimized, it appears that the minimal deviation occurs when r for the convex side is 0.5% longer than for the concave side. In this case c will be $> -1$, which means that the optimal convex surface is elliptic. This solution is about five times better than the former one.

With the above described calculations the distances between the broken lines and the full lines in FIG. 2 will obtain the values appearing in the table below for a parabolically shaped concave side or surface and a hyperbolically shaped convex side or surface:

| Level | Distance from optical axis, mm | | |
|---|---|---|---|
| A | 5  | a' = 0.02 μm  | a" = 0.02 μm |
| B | 10 | b' = 0.25 μm  | b" = 0.17 μm |
| C | 15 | c' = 1.29 μm  | c" = 0.89 μm |
| D | 20 | d' = 4.09 μm  | d" = 2.84 μm |
| E | 25 | e' = 10.00 μm | e" = 6.96 μm |
| F | 30 | f' = 20.78 μm | f" = 14.48 μm |

As stated above an accuracy of 1 milliradian is regarded as acceptable, a value which is much better than presently used optical elements may give. With parabolic and hyperbolic element surfaces as calculated according to the above mentioned methods the accuracy will be 0.16 milliradians with extremely small deviations for different wave-lengths or colours.

The values given may be seen as ideal. If for example a defect occurs, expressed as a 0.1 deviation of the constant for the hyperbolic surface, i.e. $-1.543$ instead of $-1.443$, the accuracy will still be quite acceptable or 0.27 milliradians.

Figure 3:
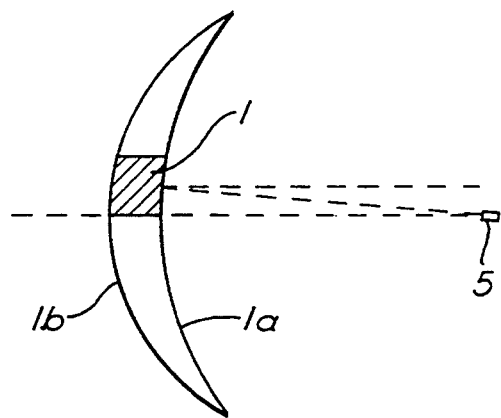
FIGS. 3 and 4 are a side view and a front view, respectively, of a larger lens, from which an optical element may be regarded to be cut out or manufactured according to the invention.
Figure 4:
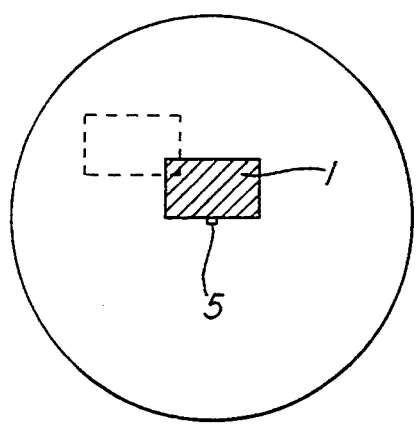

FIGS. 3 and 4 are illustrative for the possible results obtained by the calculating method according to the invention and show a hypothetical concave-convex lens calculated according to the invention. From this lens having a parabolic concave side 1a and an elliptic or a hyperbolic convex side 1b an optical element 1 for use in a parallax free sight can be taken. This optical element may have any suitable form (although a rectangular form is shown), and irrespective of where on the lens it is taken, it will have the desired properties in relation to the focal point of the lens and with regard to any external light beams hitting the convex side. A lens element 1 for use in the arrangement as shown in FIG. 1 is shown in full lines, whereas a lens element shown in dashed lines in FIG. 4 by way of example may be used for a certain weapon with an offset sight.

We claim:

1. A concave-convex optical element useful in a parallax-free gun sight of the type having a light emitting means which is reflected from a concave surface of said optical element to provide an aiming light within said gun sight; said concave-convex optical element comprising, a concave surface on a one side of said optical element having a parabolically shaped configuration, a convex surface on an opposite side of said optical element such that an optical axis extends through said concave surface and said convex surface, said convex surface having a form which is one of elliptically shaped and hyperbolically shaped, and such that any external light beam passing into said optical element through said convex surface and parallel to said optical axis continues straight through said optical element and out through said concave surface with minimal deviation.

2. A concave-convex optical element according to claim 1 in which said concave surface of said optical element is provided with layer of a partially reflecting material.

3. A concave-convex optical element according to claim 2 in which said partially reflecting material is one which will reflect light having a wavelength corresponding to the wavelength of the light emitted from said light emitting means without significant reflection of light having other wavelengths.

4. A concave-convex optical element according to claim 1 in which said concave surface of said optical element is molded in one piece of a plastic material.

5. A concave-convex optical element according to claim 4 in which said plastic material is a polycarbonate.

6. A concave-convex optical element according to claim 1 in which the parabolic, hyperbolic and elliptical shapes of said convex and said concave surfaces are defined by the formula:

$$z = \frac{(x^2 + y^2)}{r(1 + \sqrt{1 - (1/r)^2(c + 1)(x^2 + y^2)})}$$

where
 = a z-coordinate along a z axis,
x = an x-coordinate on the surface,
y = a y-coordinate on the surface,
r = double the focal length of said parabolic surface,
c = the calculated conical constant for the surface, and $c < -1$ for a hyperbolic surface, $c = -1$ for a parabolic surface, and $c > -1$ for an elliptical surface.

7. A concave-convex optical element according to claim 1 in which the parabolic shape of said concave surface is defined by the formula:

$$z = \frac{(x^2 + y^2)}{2r}$$

where
 = a z-coordinate along a z axis,
x = an x-coordinate on the surface,
y = a y-coordinate on the surface, and
r = double the focal length of said parabolic surface.

8. A concave-convex optical element according to claim 1 in which said convex surface has a hyperbolic shape defined by the formula:

$$z = \frac{(x^2 + y^2)}{r(1 + \sqrt{1 - (1/r)^2(c + 1)(x^2 + y^2)})}$$

where
 = a z-coordinate along a z axis,
x = an x-coordinate on the surface,
y = a y-coordinate on the surface,
r = double the focal length of said parabolic surface,
c = the calculated conical constant of $-1.443$.

9. A concave-convex optical element according to claim 1 which is molded in one piece of a polycarbonate, has a curvature radius of 192 mm, a parabolic focal point of 96 mm, and in which said optical element has dimensions as follows:

| Level | Distance from optical axis, mm | | |
|---|---|---|---|
| A | 5  | a' = 0.02 μm  | a" = 0.02 μm |
| B | 10 | b' = 0,25 μm  | b" = 0.17 μm |
| C | 15 | c' = 1.29 μm  | c" = 0.89 μm |
| D | 20 | d' = 4,09 μm  | d" = 2.84 μm |
| E | 25 | e' = 10.00 μm | e" = 6.96 μm |
| F | 30 | f' = 20.78 μm | f" = 14.48 μm | where A, B, C, D, E and F are levels parallel to said optical axis at the distance shown in the second columns, a', b', c', d', e' and f' represent the distance at that coordinate said convex surface is displaced from a hypothetical spherical surface of the same radius, and a", b", c", d", e" and f" represent the distance at that coordinate said concave surface is displaced from a hypothetical spherical surface of the same radius.

10. A parallax-free gun sight comprising a concave-convex optical element, a light emitting means for directing light to a concave surface of said concave-convex optical element which is reflected from said concave surface of said optical element to provide an aiming light within said gun sight, said concave-convex optical element having a concave surface having a parabolically shaped configuration and a convex surface on an opposite side of said optical element such that an optical axis extends through said concave surface and said convex surface, said convex surface having a form which is one of elliptically shaped and hyperbolically shaped, and such that any external light beam passing into said optical element through said convex surface and parallel to said optical axis continues straight through said optical element and out through said concave surface with minimal deviation.

11. A parallax-free gun sight according to claim 10 in which said concave surface of said optical element is provided with layer of a partially reflecting material.

12. A parallax-free gun sight according to claim 11 in which said partially reflecting material is one which will reflect light having a wavelength corresponding to the wavelength of the light emitted from said light emitting means without significant reflection of light having other wavelengths.

13. A parallax-free gun sight according to claim 10 in which said optical element is molded in one piece of a plastic material.

14. A parallax-free gun sight according to claim 13 in which said plastic material is a polycarbonate.

15. A parallax-free gun sight according to claim 10 in which the parabolic, hyperbolic and elliptical shapes of said convex and said concave surfaces are defined by the formula:

$$z = \frac{(x^2 + y^2)}{r(1 + \sqrt{1 - (1/r)^2(c + 1)(x^2 + y^2)})}$$

where
= a z-coordinate along a z axis,
x = an x-coordinate on the surface,
y = a y-coordinate on the surface,
r = double the focal length of said parabolic surface,
c = the calculated conical constant for the surface, and c < −1 for a hyperbolic surface, c = −1 for a parabolic surface, and c > −1 for an elliptical surface.

16. A parallax-free gun sight according to claim 10 in which the parabolic shape of said concave surface is defined by the formula:

$$z = \frac{(x^2 + y^2)}{2r}$$

where
z = a z-coordinate along a z axis,
x = an x-coordinate on the surface,
y = a y-coordinate on the surface, and
r = double the focal length of said parabolic surface.

17. A parallax-free gun sight according to claim 10 in which said convex surface has a hyperbolic shape defined by the formula:

$$z = \frac{(x^2 + y^2)}{r(1 + \sqrt{1 - (1/r)^2(c + 1)(x^2 + y^2)})}$$

where
z = a z-coordinate along a z axis,
x = an x-coordinate on the surface,
y = a y-coordinate on the surface,
r = double the focal length of said parabolic surface,
c = the calculated conical constant for the surface, here = −1.443.

18. A parallax-free gun sight according to claim 10 in which said optical element is molded of a polycarbonate, has a curvature radius of 192 mm, a parabolic focal point of 96 mm, and has dimensions as follows:

| Level | Distance from optical axis, mm | | |
|---|---|---|---|
| A | 5  | a' = 0.02 μm  | a" = 0.02 μm |
| B | 10 | b' = 0.25 μm  | b" = 0.17 μm |
| C | 15 | c' = 1.29 μm  | c" = 0.89 μm |
| D | 20 | d' = 4.09 μm  | d" = 2.84 μm |
| E | 25 | e' = 10.00 μm | e" = 6.96 μm |
| F | 30 | f' = 20.78 μm | f" = 14.48 μm | where A, B, C, D, E and F are levels parallel to said optical axis at the distance shown in the second columns, a', b', c', d', e' and f' represent the distance at that coordinate of said convex surface is displaced from a hypothetical spherical surface of the same radius, and a", b", c", d", e" and f" represent the distance at that coordinate said concave surface is displaced from a hypothetical spherical surface of the same radius.

19. A parallax-free gun sight according to claim 10 further having a light channel and a transparent window, wherein said convex-concave optical element is disposed at a forward end of said light channel, and said transparent window is disposed at a rearward end of said light channel and positioned such that any external light beam passing into said optical element through said convex surface and parallel to said optical axis will pass through said light channel and through said transparent window.

20. A parallax-free gun sight according to claim 19 in which said transparent window has two flat parallel surfaces through which said external light beams will pass with a minimum of distortion.

* * * * *